(12) United States Patent
Münker et al.

(10) Patent No.: US 6,580,262 B1
(45) Date of Patent: Jun. 17, 2003

(54) METHOD AND DEVICE FOR MEASURING THE POSITION OF A METAL STRIP

(75) Inventors: Wolfram Münker, Kreuztal (DE); Hubert Schwan, Wissen (DE); Harald Wagner, Kreuztal (DE)

(73) Assignee: Elektro-Mechanik GmbH (DE)

( * ) Notice: Subject to any disclaimer, the term of this patent is extended or adjusted under 35 U.S.C. 154(b) by 0 days.

(21) Appl. No.: 09/483,055

(22) Filed: Jan. 13, 2000

(30) Foreign Application Priority Data

Jan. 13, 1999 (DE) ......................................... 199 00 981

(51) Int. Cl.$^7$ ........................... G01B 7/04; G01R 27/26; H01F 30/12
(52) U.S. Cl. .................... 324/76.75; 324/662; 324/656; 324/207.18
(58) Field of Search ................... 324/76.11, 76.75, 324/76.74, 76.81, 658, 661, 686, 688, 695, 207.17, 654, 687, 662, 656, 207.18; 73/1.79

(56) References Cited

U.S. PATENT DOCUMENTS

| | | | | |
|---|---|---|---|---|
| 4,816,759 A | * | 3/1989 | Ames et al. | 324/207.17 |
| 5,339,029 A | * | 8/1994 | Wagner | 324/207.12 |
| 6,264,793 B1 | * | 7/2001 | Ojala et al. | 162/198 |
| 6,307,382 B1 | * | 10/2001 | Field | 324/127 |

FOREIGN PATENT DOCUMENTS

| | | |
|---|---|---|
| EP | 0448988 | 10/1991 |
| EP | 0529440 | 3/1993 |
| EP | 0717268 | 6/1996 |

\* cited by examiner

*Primary Examiner*—N. Le
*Assistant Examiner*—Anjan K. Deb
(74) *Attorney, Agent, or Firm*—Schnader Harrison Segal & Lewis LLP

(57) ABSTRACT

A method for inductively measuring the position of a metal strip is proposed, in which, at least on one side of the strip, a primary coil fed by AC voltage is arranged on one side of a strip edge and a secondary coil is arranged on the other side of the strip edge, which secondary coil measures the voltage which is induced by the primary coil and results from the coupling effect with the primary coil and the metal strip situated in between, in which, as a result of lateral relative movement between the metal strip and the primary and secondary coils, the measurement gradient that can be obtained as a result is determined and compared with a predetermined optimum measurement gradient, whereupon, in the event of a difference, the measurement gradient that has been ascertained is matched electronically to the predetermined optimum measurement gradient and the adapted values then obtained are used for the current strip movement control. This method can also be used for capacitively measuring the position of a metal strip.

17 Claims, 7 Drawing Sheets

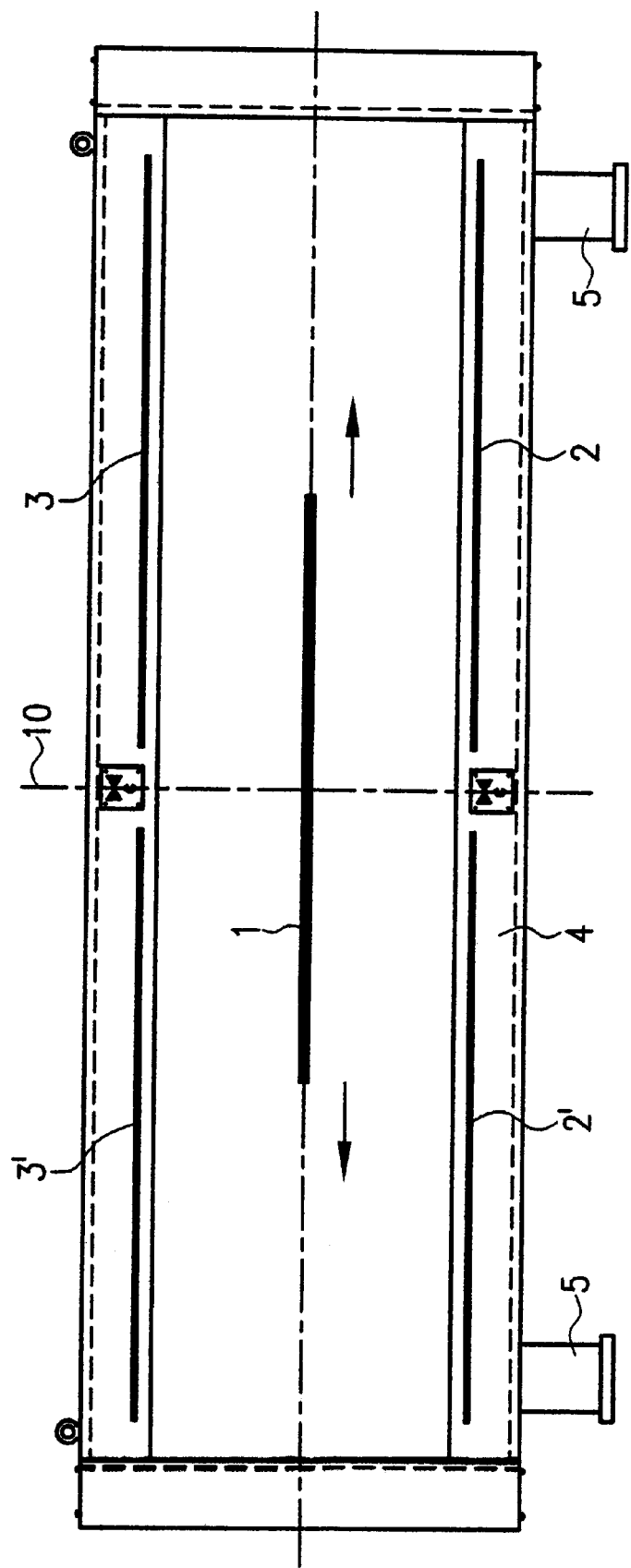

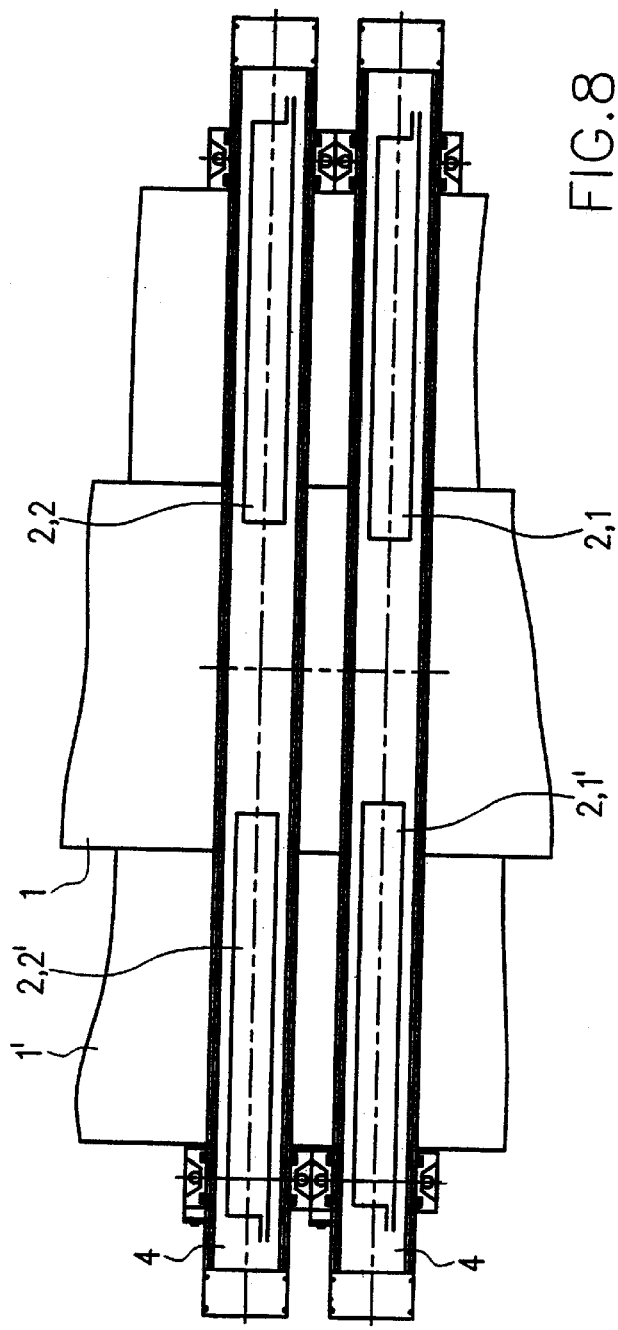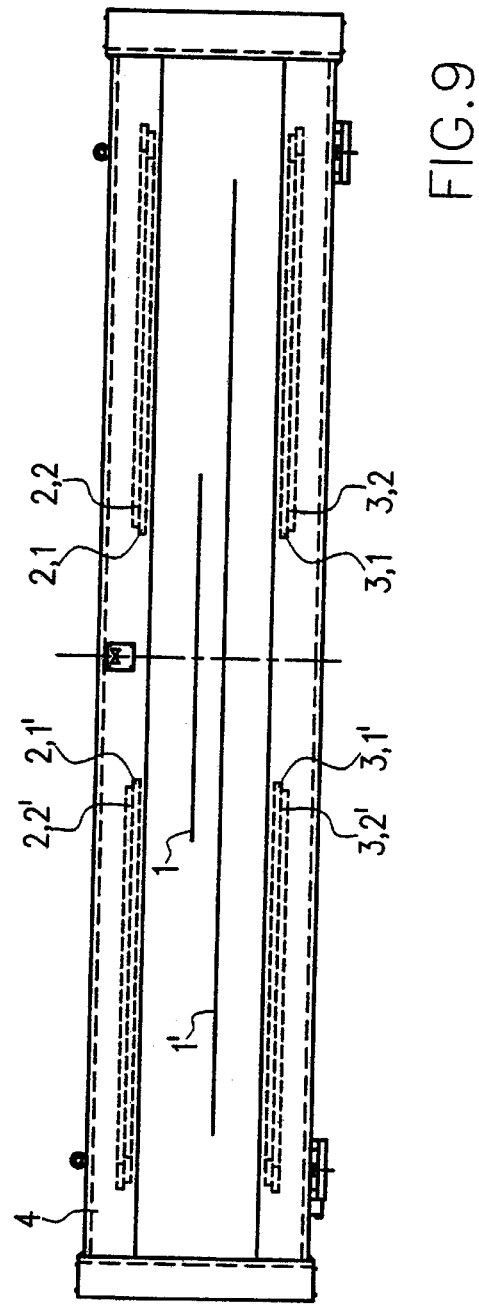

METHOD AND DEVICE FOR MEASURING THE POSITION OF A METAL STRIP

FIELD OF THE INVENTION

Figure 1:
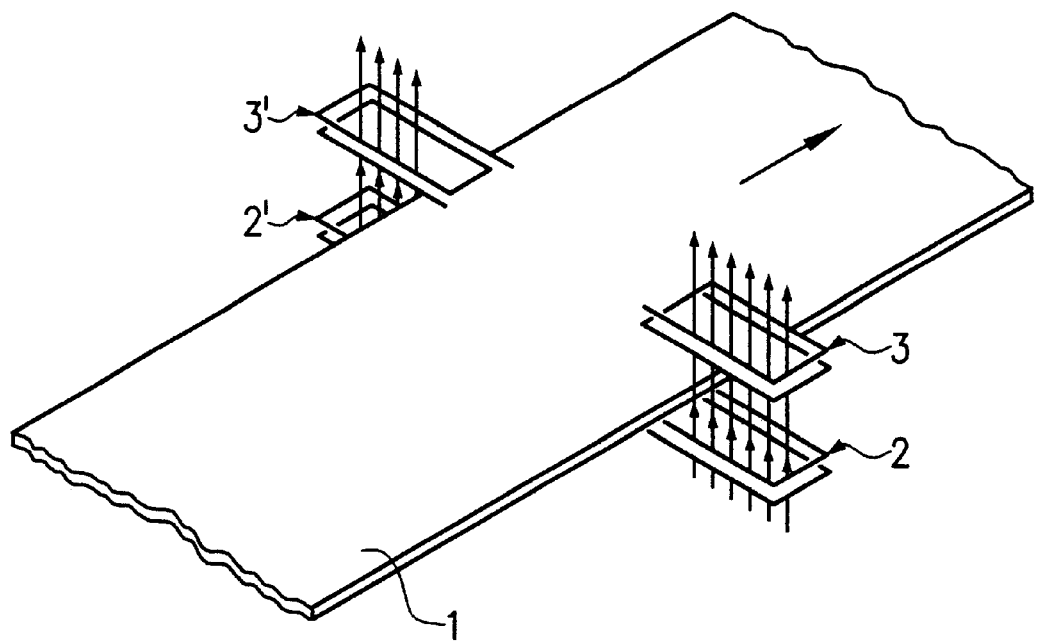

The invention relates to a method and an apparatus for inductively or capacitively measuring shifts of the lateral position of a longitudinally moving metal strip.

BACKGROUND

EP 0 529 440 discloses, for the purpose of inductively measuring and controlling the position of a moving metal strip, providing, on one side of said metal strip, e.g. a primary coil fed by an AC voltage below the strip edge and, opposite said primary coil, a secondary coil above the strip edge, an exciter circuit being provided for feeding the AC voltage into the primary coil and a detector circuit for determining the voltage induced in the secondary coil as a result of the coupling effect with the primary coil. The stationary primary and secondary coils have the shape of an approximately elongate rectangle, and they are arranged with their longitudinal axis transverse with respect to the strip edge. The measurement signals determined by the coils are processed for the strip travel control, in order to keep the strip in a predetermined position. This structure corresponds to that shown in FIG. 1.

In order to compensate for the influence of different material properties and/or different thickness dimensions of the strip during the measurement, it is also known to provide a reference sensor in the form of a primary and secondary reference coil in the center of the strip between the primary and secondary coils on both strip edges. This reference sensor ascertains the minimum possible coupling, the signal obtained by the reference sensor being subjected to further processing with the signals obtained by the two strip edge sensors.

The arrangement of a reference sensor between the primary and secondary coils requires a certain amount of space, and different strip widths, which likewise influence the measurement signal, cannot be compensated for by such a reference sensor. In addition, a known configuration of this type is not suitable for narrow strip widths, for example if the strip width is of the order of magnitude of the dimensions of the reference sensor.

SUMMARY OF THE INVENTION

The invention is based on designing a method and an apparatus of the type specified in the introduction in such a way that, with the smallest possible space requirement, sidewise variations of position of different moving strip materials can be measured exactly and, in particular, it is also possible to compensate for any change in the measurement signal resulting from the use of different strip widths.

By virtue of the fact that spaced-apart coils are arranged at opposite edges of the moving metallic strip and, as a result of a relative movement between the coils and the deflection of the strip transversely with respect to the direction of strip movement, the measurement gradient is determined and compared to the optimum measurement gradient electronically for the strip movement control, it is possible, irrespective of the different material properties of the strip and/or its thickness and width dimensions, and/or the throughput level of the strip, to obtain a measurement signal which represents the maximum voltage change as a function of the sidewise deflection of the strip, with the result that optimum control conditions are always obtained.

Compensation of different measurement signals is thus achieved without a reference sensor, as a result of which the measuring apparatus can be designed to be very compact and also effective for narrow strip widths.

BRIEF DESCRIPTION OF THE INVENTION

Figure 3:
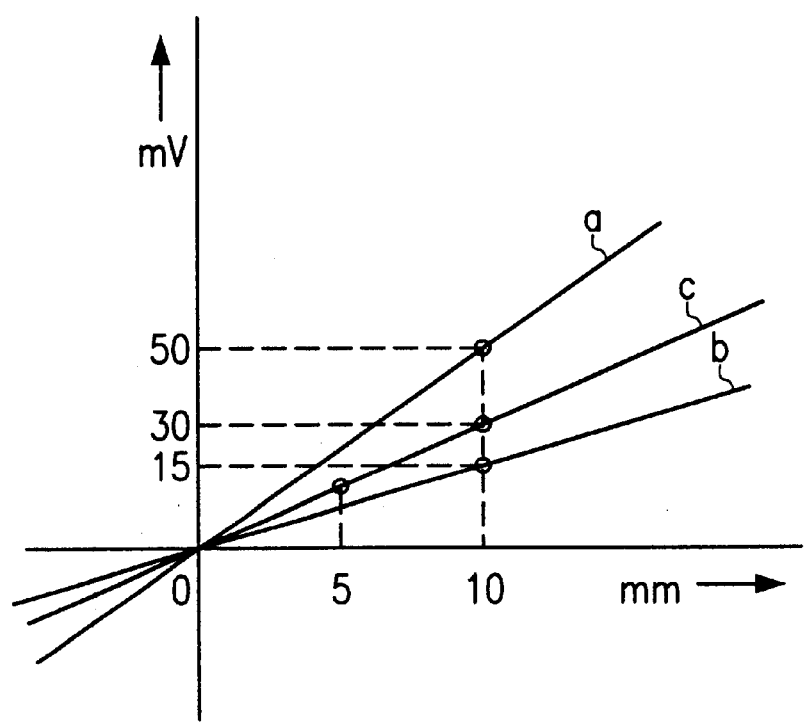
Figure 4:
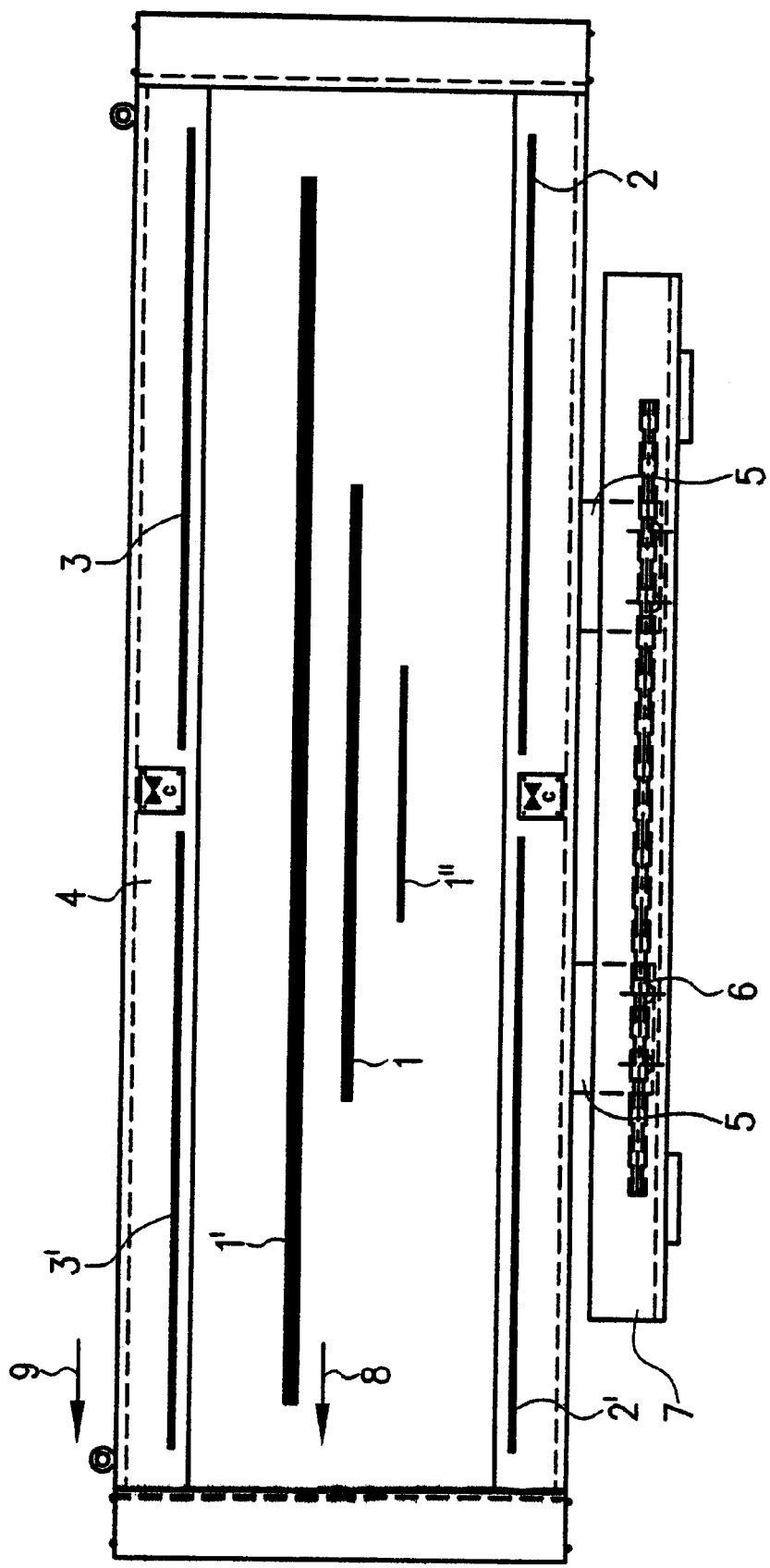
Figure 5:
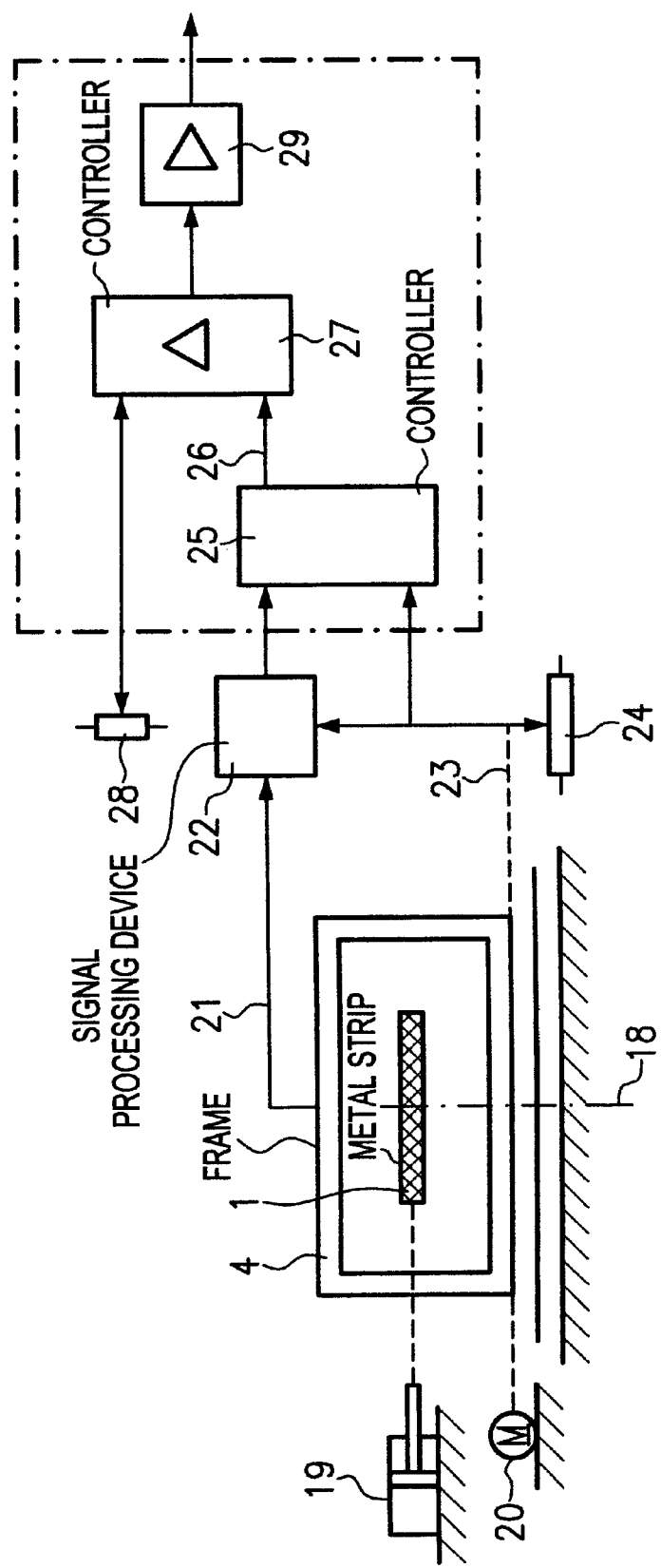
Figure 6:
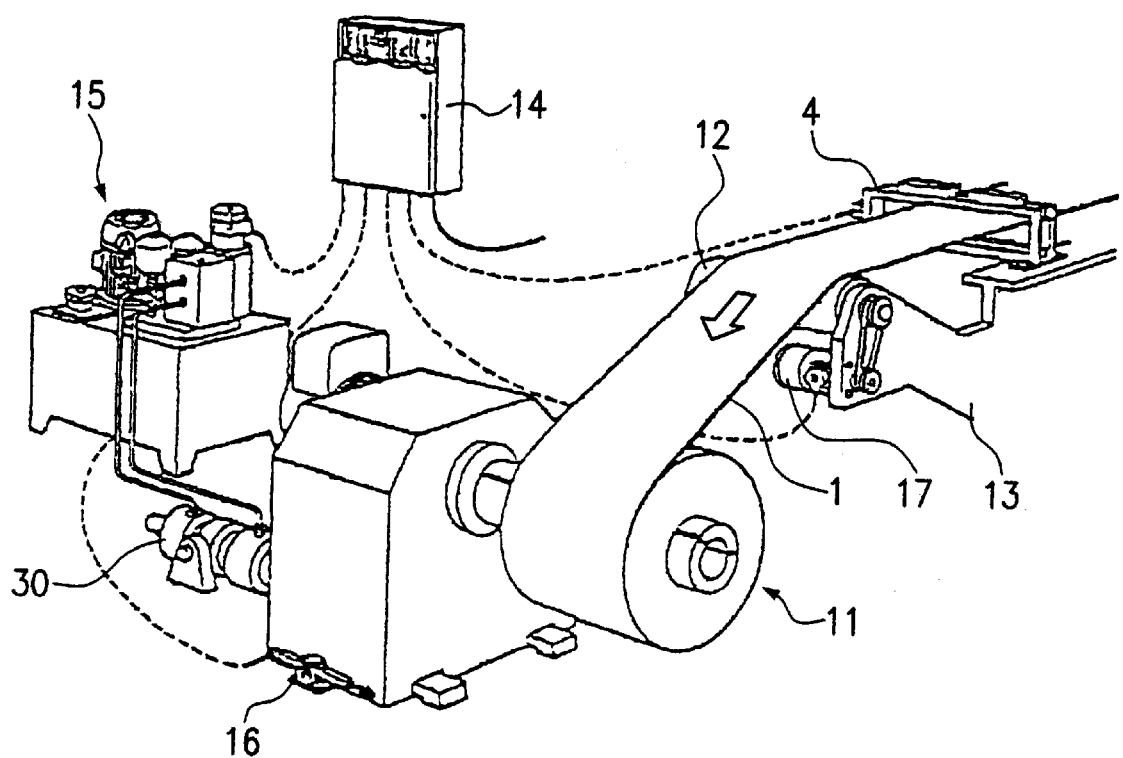
Figure 7:
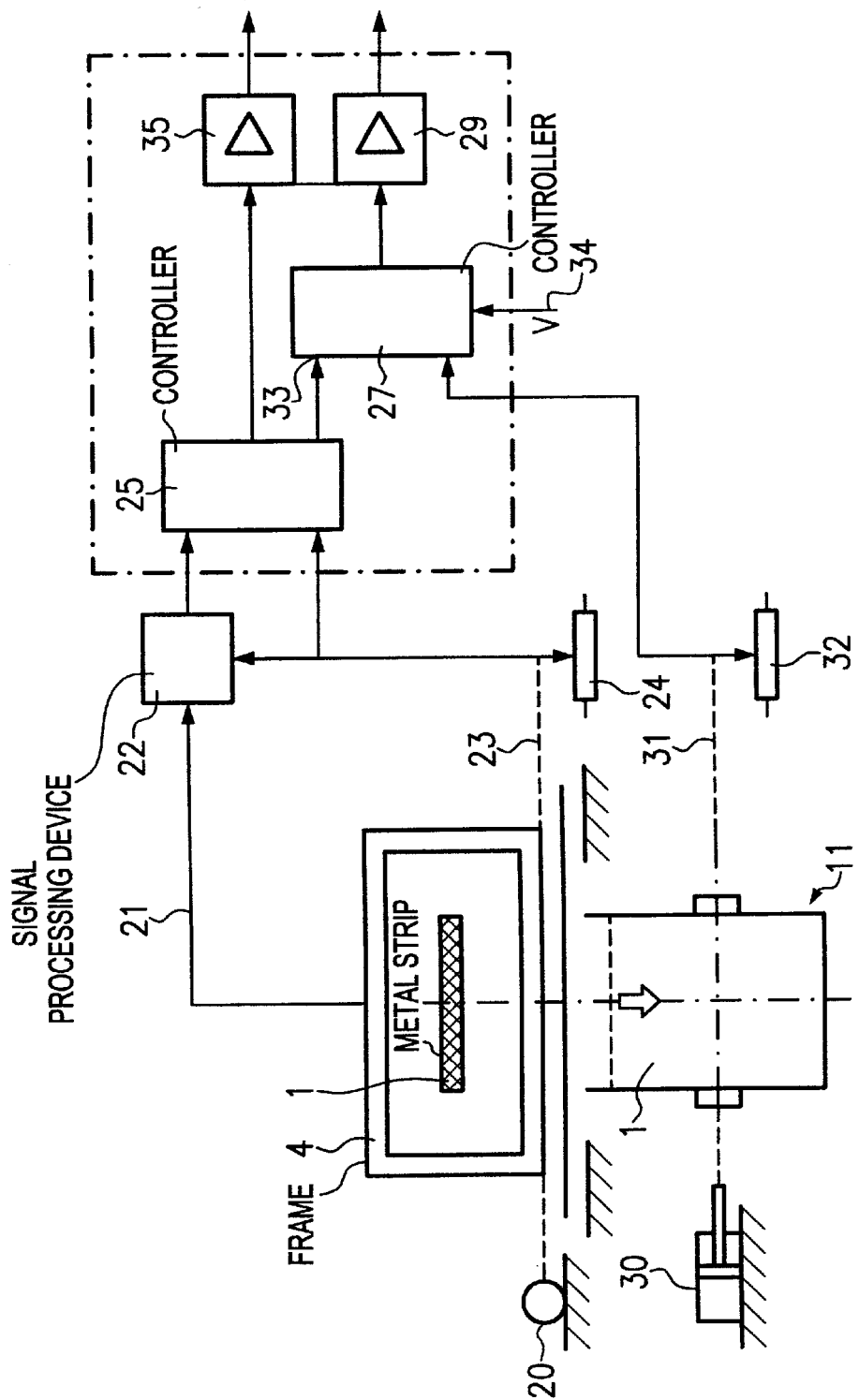

The invention is explained in more detail by way of example with reference to the drawing, in which:

FIG. 1 schematically shows a measuring apparatus with primary and secondary coils in a perspective view, FIG. 2 shows a view of the stationary measuring apparatus according to FIG. 1 in the direction of strip movement, FIG. 3 is a graph that shows a diagram for elucidating the measurement gradient, FIG. 4 schematically shows, in the view according to FIG. 2, a configuration of a movable measuring apparatus with differently dimensioned metal strips, FIG. 5 shows a schematic representation of the strip movement control, FIG. 6 shows a perspective view of a strip movement control unit on a take-up reel, FIG. 7 shows and illustration in accordance with FIG. 5 in connection with a take-up reel, FIG. 8 shows an offset arrangement of coils in a plan view, and FIG. 9 shows a view of the coil arrangement according to FIG. 8 in the direction of strip movement.

FIG. 1 shows a metal strip 1 traveling in the direction of the arrow, on the underside of which metal strip, adjacent to each of the two edges, rectangular primary coils 2, 2' are arranged transversely to and spaced from the edges of the metal strip, to which an AC voltage is fed by a device (not illustrated). Secondary coils 3 and 3' are arranged, opposite the primary coils, spaced from the opposite edge of the metal strip 1, which secondary coils measure the induced voltage, represented by arrows, as a function of the intervening coverage by the metal strip 1 and are connected to a signal processing device (further illustrated hereinafter), which processes the measurement signals for the central control of the traveling strip 1.

FIG. 2 shows the primary and secondary coils arranged in a frame 4, the frame 4 being arranged in a stationary manner and being positioned on supports 5. The frame 4 may be provided with shielding for the coils, which may again be configured in different ways, for example as coils wound from a ribbon cable. The coils 2 and 3 may also be designed as a stack of printed coils, similar to a printed circuit.

If the metal strip 1 moves laterally to the left or right in FIG. 2 during its travel in the direction of the arrows, then a change in the voltage mV in dependence on the adjustment distance of the metal strip is obtained as a measurement signal.

FIG. 3 shows the dependence of the measurement signal mV on the adjustment distances of different metal strips. Given a predetermined metal strip, a characteristic with a constant or continuous slope is obtained in this case, as represented e.g. by the straight line a in FIG. 3.

If the intention is to use the measuring apparatus to monitor the position of a different metal strip having different material properties and/or different dimensions, as is represented for elucidation purposes in FIG. 4 in the form of three different metal strips 1, 1' and 1", then an altered dependence of the measurement signal mV on the lateral deflection is obtained. For the narrow and thin metal strip 1"

represented in FIG. 4, for example, the dependence of the voltage mV on the adjustment distance as represented by the line b in FIG. 3 is obtained, whereas a signal or measurement gradient in accordance with the line c in FIG. 3 is obtained for the wide and thick metal strip 1' of FIG. 4.

It is assumed for example that the metal strip 1 represented in FIG. 4 produces a maximum measurement gradient corresponding to the line a, then a maximum measurement signal of 50 mV is obtained given a specific lateral deflection of the strip 1 relative to the coils 2, 3 of e.g. 10 mm, while a weaker measurement signal is obtained in the case of a different metal strip and the same deflection, as is evident from FIG. 3. It thus turns out that a high measurement gradient (a) of FIG. 3 means that a high control accuracy of the strip movement control is also attained, while a shallower measurement gradient (b) or (c) of FIG. 3 leads to a correspondingly poorer control accuracy. The strip movement control returns the strip 1 more rapidly into the starting position in the case of a maximum measurement signal of 50 mV, for example, than in the case of a measurement signal of 15 mV. In practice, depending on different strip widths and different material properties, differences occur at the measurement signal, in the case of the same deflection, by a factor of three or four.

In order to obtain the highest possible measurement accuracy, the maximum measurement gradient a, as results under optimum conditions such as material properties and strip width or thickness in relation to the dimensions of the primary and secondary coils, is stored as reference value in the electronic measurement signal processing device (not illustrated in FIG. 5). During the measurement of another metal strip 1' or 1", differing from this reference strip 1, the measurement gradient c that can be attained for the given conditions is determined by means of a lateral relative adjustment between the strip 1' and the measuring coils 2, 3. In this case, given a relative adjustment of e.g. 5 mm and given an adjustment of e.g. 10 mm, the voltage signal mV obtained in the process can be determined. From the two measured values for an adjustment distance of 5 and 10 mm, the measurement gradient c under the given conditions is produced. A single reciprocal movement between the strip and the coils also suffices for determining the measurement gradient.

The measurement gradient c obtained under the given conditions is compared with the stored optimum measurement gradient a. In the event of a different measurement gradient, the measurement gradient c obtained under the given conditions is matched electronically (for example by means of a correction factor) to the measurement gradient a, with the result that, during normal strip movement control, given a deflection of e.g. 10 mm, although only a voltage signal of 30 mV is obtained, it is converted or matched to a voltage signal of 50 mV in the signal processing device, whereupon the measurement signal thus corrected is forwarded to the strip movement control, which then, under optimum conditions, returns the strip back to the starting position or central position in the case of the apparatuses according to FIGS. 2 and 4, in which a measurement signal of 0 mV is present if the center of the strip coincides with the central axis 10 of the measuring apparatus. As a result, a high or maximum control accuracy is obtained in each case irrespective of the dimensions and the properties of the metal strip.

In order that the adaptation of the measurement gradient under given operating conditions can also be performed during the strip movement controls, the frame 4 carrying the primary and secondary coils 2, 3 is arranged such that it can be displaced transversely with respect to the travel direction of the strip 1. In the exemplary embodiment according to FIG. 4, the supports 5 of the frame 4 are fitted on a slide 6, which can be moved e.g. by chains, is arranged in a stationary housing 7 and enables the frame 4 to move laterally to both sides. The lateral adjustment of the frame 4 with the measuring coils 2, 3 fitted such that they are stationary therein is effected by an adjusting device (not illustrated) which can be driven by electrical signals. Such adjusting devices are known per se for strip movement control devices.

The strip can also be moved laterally relative to the frame 4 by the adjustment of a deflection roller 12 (FIG. 6), via which the strip movements.

If the metal strip 1' shown in FIG. 4 is deflected laterally in the direction of the arrow 8 during its movement through the rectangular frame 4, then the adjusting device which moves the slide 6 can be driven by the measurement signal obtained in this way, such that the slide 6 moves the frame 4 in the direction of the arrow 9 in order that the frame 4 with the measuring coils 2 and 3 follows up the deflection of the strip 1'. In this case, different measurement signals mV are obtained depending on the movement distance, and thus the resultant measurement gradient, which is compared with the optimum measurement gradient a and is matched to the latter in the event of a difference, with the result that the strip movement control can operate with maximum control accuracy.

This matching of the measured values obtained to the maximum measurement gradient can be performed at specific time intervals or cyclically during a momentary interruption in the strip movement control with the metal strip continuing to move, with the result that the strip movement control itself is not impaired by this adaptation operation. Cyclic checking and adaptation of the measurement gradient are appropriate principally when the strip movement control operates with pulsed excitation of the measuring coils, with the result that the checking of the measurement gradient can be performed between the cyclic taking of measured-value by the primary and secondary coils 2, 3.

In the case of the adaptation of the measurement gradient during the strip movement control, the movement distance of the frame 4 must be taken into consideration during the signal processing and subtracted from the adjustment distance of the metal strip, in order to achieve control of the strip movement to the correct desired position, the center of the frame constituting the desired position of the strip. The adaptation of the measurement gradient can be performed in response to an electrical command or cyclically without interrupting the strip movement control.

It is also possible, however, to adapt the measurement gradient before the strip movement control is activated, with the result that, during the operation of the strip movement control, the frame 4 in FIG. 4 can remain stationary and, by way of example, is adjusted again for an adaptation operation only when another metal strip that is intended to be monitored is used. This adaptation can also be performed with the strip stationary. In the event of a material change, a calibration command, for example, may be passed to the signal processing device, whereupon, by means of the adjusting device (not illustrated), the slide 6 with frame 4 can be laterally adjusted and the described adaptation of the measurement gradient can be performed either singly before the strip movement control commences or cyclically during the strip movement control. In the case of cyclic checking of the measurement gradient during the strip movement control, storage of a correction factor, for example, can be omitted.

If a maximum measurement gradient of 100% is obtained, by way of example, under optimum conditions then this can be assigned the factor 1, while in the case of a measurement gradient half as large, of 50%, corresponding to a factor of 0.5, this is divided by a correction factor in such a way that the factor 1 is obtained again for the strip movement control.

If the frame 4 is made to follow the deflection of the metal strip 1, as is indicated by the arrows 8 and 9 in FIG. 4, then it is not necessary to adjust the frame 4 laterally to such an extent that the 0 or central position of the strip 1 is reached relative to the frame 4 with the coils 2 and 3 fitted such that they are stationary therein. If this adjustment movement as far as the 0 or central position of the strip 1 is performed, then it is possible to ascertain the adjustment distance of the frame 4 or of the slide 6 and to use it for the current strip movement control, while the adaptation of the measurement gradient which is derived from the adjustment movement of the frame 4 relative to the strip 1 is performed beforehand.

The apparatus with primary and secondary coils at the two strip edges as represented in FIG. 4 is provided for a strip center control in which the moving metal strip 1 is held with its center on the central axis 10 between the measuring coils. However, the method described is also possible in the case of a single-sided measurement of a strip edge, in which case a primary coil 2 and a secondary coil 3 are provided only at one strip edge and only this one edge of the metal strip 1 must be held in a specific position.

The described adaptation of the measurement gradient can also be provided in the same way in the case of a capacitive apparatus for contactlessly detecting the position of a traveling strip made of conductive material, in which case at least one transmission electrode connected to an oscillator and at least one detector electrode, which is capacitively coupled to the transmission electrode, are arranged on one side of the material strip, parallel to the latter, in such a way that the two electrodes reach over the edge of the strip, as is also the case with the coils 2 and 3 represented in FIG. 1, plate electrodes merely being provided instead of the coils 2, 3. A capacitive measuring apparatus of this type is described e.g. in EP 0 448 988.

FIG. 5 schematically shows the structure of the strip movement control. 18 designates the axis of the installation center (for example of a furnace, a strip treatment installation or the like), the intention generally being for the center of the strip to be made to coincide with the installation center 18. An adjusting device for the strip position is indicated schematically at 19. 20 is a drive motor for adjusting the frame 4, whose center is aligned with the installation center in the exemplary embodiment illustrated. A measurement signal from the coils 2, 3, which are not represented in FIG. 5, is passed via the line 21 to a measurement signal processing device 22, which likewise receives signals relating to the distance of the frame displacement via a line 23. 24 represents a measuring unit for detecting the displacement distance of the frame 4. The output signal of th e measurement signal processing device 22 is passed to a first controller 25, which also receives the distance signal from the frame 4. At the output 26 of the controller 25, an actual value of the strip position is passed to a second controller 27, which receives a desired value of the strip position from a desired value potentiometer 28. On this desired value potentiometer 28, it is also possible to set a central displacement of the strip relative to the installation center 18. 29 indicates an amplifier, by means of which the strip adjusting device 19 is driven, which may also correspond to the deflection roller 12 in FIG. 6.

The measurement signal output from the measurement signal processing device 22 to the controller 25 constitutes a corrected measurement signal on account of the inclusion of the frame displacement distance.

The components surrounded by a dash-dotted line, including the measurement signal processing device 22, essentially form the strip movement control unit 14 in FIG. 6.

The controller 25 may be designed as a adder and the controller 27 may be designed as a differential amplifier. 29 is an output amplifier which drives an electrohydraulic control unit by means of which the actuating cylinder 19 is activated. At 28, the value zero is normally set, that is to say a strip center corresponding to installation center. This corresponds for example to the passage of the strip 1 through a furnace, during unwinding from a reel or the like.

FIG. 6 shows a strip movement control device on a take-up reel 11, which can be displaced transversely with respect to the direction of strip movement and on which the strip 1 is wound via a deflection roller 12. The displaceable frame 4 with the coils 2, 3, or with the electrodes in the case of capacitive sensing, is mounted on a stationary rack 13, on which the deflection roller 12 is also mounted. 14 designates a strip movement control unit, dashed lines representing the connecting lines to the units to which the strip movement control unit 14 is connected. 15 is an electrohydraulic controller with a supply unit and at 16 a potentiometer is illustrated on the take-up reel, by means of which the lateral position of the reel is determined. The strip movement control unit 14 is connected to the potentiometer 16 and receives the respective actual values of the strip position from the frame 4. At 17 a speed sensor is represented on the rack 13, by means of which the strip movement speed via the deflection roller 12 is determined. This speed sensor 17 is likewise connected to the strip movement control unit 14.

A delay between the detection of the strip position on the frame 4 and the winding of the strip 1 on the reel 11 can be taken into account during the strip movement control by the determination of the strip movement speed at 17, with account being taken of the spacing between the frame 4 and the reel 11.

The same structure can also be provided in the case of a paying-out reel.

FIG. 7 shows the structure of the strip movement control device on the take-up reel 11 according to FIG. 6, the same reference symbols as in FIG. 5 being used for identical or corresponding components. In this configuration, the strip position forms the desired value because the coil wound onto the reel must have a uniform winding. In this case, larger distances have to be covered during the control than in the embodiment according to FIG. 5, because the coil center must coincide with the strip center at the given instant when being taken up, in order that the edges of the coil terminate smoothly or are aligned smoothly with one another. For this purpose, the reel is moved laterally by means of a hydraulic cylinder 30 and the reel displacement distance is passed via the line 31 to a further unit 32 for detecting the displacement distance, which may be designed as a potentiometer. At the same time, the reel displacement distance is passed to the second controller or differential amplifier 27, which receives the actual value of the strip position from the first controller or adder 25 at 33. The reel displacement distance corresponds to the actual value of the reel position. The strip movement speed determined by the speed pick-up 17 (FIG. 6) is input at 34 in order to take account of the time delay between the determination of the strip position on the frame 4 and the reel 11. In this embodiment, the reel displacement by means of the cylinder 30 is driven via the output amplifier 29, while the adjustment of the frame 4 by means of the motor 20 is driven via the output amplifier 35. Otherwise, the control according to FIG. 7, relating to the components 22 to 25, corresponds to the control according to FIG. 5. A major advantage of the described adaptations of the measurement gradient is that the strip can be offset from the center by a predetermined amount in a targeted manner, as is necessary for specific applications. Such a central displacement involves offsetting the strip center for example by 10 mm to the left or right of the center of the frame 4. This preset can be input via a potentiometer, for example. If a central displacement of 10 mm is set at the potentiometer, then a different central displacement is obtained as a function of the respective measurement gradient in the case of the known strip movement controls. By contrast, according to the invention, the preset at the potentiometer drives the stored optimum measurement gradient, which, depending on the preset of the central offset, produces a permissible conversion, irrespective of the measurement gradient caused by the respective strip.

The desired value for the central displacement of the strip position can be preset by any suitable device, while the actual value of the strip position is formed by the difference between the two output signals of the two sensor pairs of the measuring device. By way of example, the desired value is always 0V in the case of the customary central control without a central displacement. Presetting a specific desired value other than 0 means that, by way of the optimum measurement gradient, the corresponding actual value is always obtained in the form of a central offset in mm, as can be read from the measurement gradient a in FIG. 3, even if the strip 1 respectively traveling in the installation produces e.g. a measurement gradient c.

In FIG. 3, the characteristics a, b, c running through the origin indicate that a negative output signal results from a lateral deflection of the strip in the opposite direction.

FIGS. 8 and 9 show an offset arrangement of coils in the frame 4. The transmission or primary coils 2.1 and 2.2 on both sides of the strip 1 which are represented in the plan view according to FIG. 8 may be offset for example by approximately 15 mm relative to one another on one side. As shown by FIG. 9, the receiver or secondary coils 3.1 and 3.2 are also arranged offset relative to one another in the same way as the primary coils, where e.g. the secondary coil 3.1 corresponds to the arrangement of the primary coil 2.1. In FIG. 9, a narrow strip is represented by 1 and a wide strip is represented at 1', for elucidation purposes.

The frame 4 with the coils 2.1, 2.2 and 3.1, 3.2 is arranged to be stationary, the offset arrangement of the coils simulating a strip movement transversely with respect to the travel direction. In this case, by way of example, measurement is first effected by means of the coils 2.1 and 3.1, the measurement is briefly interrupted and measurement is effected anew by means of the coils 2.1' and 3.1', whereupon a signal relating to the strip position is obtained as is the case with the coil arrangement according to FIGS. 1 and 2. Measurement is thereupon effected by means of the coils 2.2 and 3.2, which are offset with respect thereto, the measurement is briefly interrupted again and renewed measurement is effected by means of the opposite coils 2.2' and 3.2', with the result that a symmetrical displacement with respect to the strip edges is theoretically determined. The difference signal between the two measurement operations produces the measurement gradient under the predetermined operating conditions. Nothing is moved yet the measurement gradient is nonetheless obtained as in the case of a relative displacement between the strip 1 and the coils 2, 3 in the embodiment according to FIG. 2. For the described measurement of the measurement gradient, pulsing takes place a total of four times while the measurement is performed.

The offset coil arrangement according to FIGS. 8 and 9 has the advantage that a relative movement between the frame and the strip is not necessary. Such an adjustment movement is disadvantageous under certain circumstances. A coil offset of approximately 15 mm is generally sufficient for the central control of the strip. In this case, the simulated movement can be used. For greater distances, as are necessary for example in the application on the take-up reel 11, the offset arrangement of the coils is not expedient.

The coils may be arranged offset next to one another in the travel direction of the strip, as shown by FIG. 8. However, it is also possible to arrange the coils offset one above the other, as shown schematically by FIG. 9.

What is claimed is:

1. A method for inductively measuring the position of a longitudinally moving metal strip, in which, at least on one side of the strip, a primary coil fed by AC voltage is arranged adjacent said one side of a strip edge and a secondary coil is arranged adjacent the corresponding opposite side of said strip edge, with said metal strip between said primary and secondary coils, which secondary coil measures the voltage which is induced by the primary coil and results from the coupling effect with the primary coil and said metal strip situated there-between, in which, as a result of voltage measurement at two different lateral positions because of lateral relative movement between said strip and said coils, a measurement gradient is obtained as a result, and can be determined and compared with a predetermined optimum measurement gradient, whereupon, in the event of a difference, the measurement gradient that has been ascertained is matched by electronic means to said predetermined optimum measurement gradient and the adapted values thereby obtained are applied to maintain strip movement control.

2. A method for capacitively measuring the position of a longitudinally moving metal strip, in which, at least on one side of the strip, a transmission electrode connected to an oscillator is arranged adjacent said one side of a strip edge and a detector electrode capacitively coupled to said electrode is arranged adjacent the corresponding opposite side of said strip edge, and, as a result of a lateral relative movement between said metal strip and said transmission and detector electrodes, a resulting measurement gradient is determined and compared with a predetermined optimum measurement gradient, whereupon, in the event of a difference, the measurement gradient that has been ascertained is matched by electronic means to the predetermined optimum measurement gradient and the adapted values then obtained are applied for strip movement control.

3. A method for inductively measuring the position of a longitudinally moving metal strip, in which, adjacent to a strip edge on one side of said strip at least two primary coils are arranged offset laterally with respect to the direction of strip movement and are alternatingly fed by AC voltage, and, wherein adjacent to the corresponding opposite side of said strip edge at least two secondary coils are arranged with said metal strip between said primary and secondary coils, and which are also offset laterally with respect to the direction of strip movement and connected to synchronically alternatingly measure any voltages which are induced by the respective said primary coils in response to the coupling effects of said primary coils and the metal strip situated in between, wherein the detected voltage difference of the two secondary coils is, as a ratio to the fixed distance between said offset coils, a measure for an actual measurement gradient which is to be calculated by an electronic means, and wherein this actual measurement gradient is compared to a predetermined optimum measurement gradient, whereupon in case of a difference the determined measurement gradient is matched to said predetermined optimum measurement gradient by said electronic means and the adapted values so obtained are applied for strip movement control.

4. The method as claimed in claim 1 or 2, including the step in which a frame carrying the coils or electrode, is adjusted transversely with respect to the strip.

5. The method as claimed in claim 1 or 2, in which the relative adjustment between the coils or electrodes and the strip is performed during the strip movement control and wherein the adjustment distance of the coils or electrodes relative to the strip is subtracted from the adjustment distance of the strip.

6. The method as claimed in claim 1, in which the measurement gradient is determined and checked cyclically during strip movement control, while the primary coil is excited cyclically with an AC voltage.

7. The method as claimed in claims 1, 2, 3, or 6, in which the adaptation of the measurement gradient is performed continually during the strip movement control.

8. The method as claimed in claim 1 or 2, in which, for the central displacement of the strip, a predetermined desired value is converted into an actual value using the predetermined optimum measurement gradient.

9. The method defined in claim 1, wherein said voltage measurement is made at two positions transversely of said strip.

10. The method defined in claim 1, wherein said voltage measurement is made by stationery coils which are arranged offset transversely.

11. An apparatus for inductively measuring the position of a metal strip, in which, at least on one side of the strip, a primary coil fed by an AC voltage is arranged on one side of a strip edge and a secondary coil is arranged on the other side of the strip edge, having an exciter circuit for feeding AC voltage into the primary coil and a detector circuit for determining the voltage induced in the secondary coil as a result of the coupling effect with the primary coil, wherein the primary and secondary coils are adjustable laterally with respect to the direction of strip movement, over a predetermined distance for determining a measurement gradient by taking at least two voltage measurements at two different positions, and wherein electronic means are provided for comparing the measurement gradient, determined in this way, with a predetermined optimum measurement gradient, whereupon in case of a difference the determined measurement gradient is matched to the predetermined optimum measurement gradient by said electronic means.

12. An apparatus for capacitively measuring the position of a metal strip, in which, at least on one side of the strip, a transmission electrode connected to an oscillator is arranged on one side of a strip edge and a detector electrode, which is capacitively coupled to the transmission electrode, is arranged on the other side of the strip edge, and having a detector circuit for determining the voltage induced in the detector electrode as a result of the coupling effect with the transmission electrode, wherein the transmission and detector electrodes are adjusted laterally with respect to the direction of strip movement for obtaining a measurement gradient between electrodes and the metal strip.

13. The apparatus as claimed in claim 11 or 12, in which a frame carrying the coils or electrodes are adjusted laterally with respect to the strip by an adjusting device.

14. The apparatus as claimed in claim 13, in which the frame is fitted on a slide.

15. An apparatus for inductively and/or capacitively measuring the position of a metal strip, in which, on at least one side of the strip, primary and secondary coils or transmission and detector electrodes are arranged on both sides of the strip edges, wherein two coils or electrodes which are arranged offset relative to one another and are arranged in a stationary manner relative to the strip are in each case provided above and below the strip edge, and connected for determining a measurement gradient by means of at least two voltage measurements and wherein electronic means are provided for comparing the measurement gradient determined in this way with a predetermined optimum measurement gradient, whereupon in case of a difference the determined measurement gradient is matched to the predetermined optimum measurement gradient by said electronic means.

16. A method for inductively or capacitatively measuring the position of a longitudinally moving metal strip, in which, at least on one side of the strip, a primary transmitter fed by electrical voltage is arranged adjacent said one side of a strip edge and a secondary electrical detector is arranged adjacent the corresponding opposite side of said strip edge, with said metal strip between said primary transmitter and said secondary detector, which secondary detector measures the voltage in response to the primary transmitter and results from the coupling effect with the primary transmitter and said metal strip situated there-between, in which, as a result of voltage measurement at two different positions laterally with respect to the longitudinal movement of said strip, a measurement gradient that can be obtained as a result is determined and compared with a predetermined optimum measurement gradient, whereupon, in the event of a difference, the measurement gradient that has been ascertained is matched by electronic means to the predetermined optimum measurement gradient and the adapted values then obtained are applied for strip movement control.

17. Apparatus for inductively or capacitatively measuring the position of a longitudinally moving metal strip, in which, at least on one side of the strip, a primary transmitter fed by electrical voltage is arranged adjacent said one side of a strip edge and a secondary electrical detector is arranged adjacent the corresponding opposite side of said strip edge, with said metal strip between said primary and secondary transmitter and detector, which secondary detector measures the voltage in response to the primary transmitter and results from the coupling effect with the primary transmitter and said metal strip situated there-between, in which, as a result of voltage measurement at two different positions laterally with respect to the longitudinal movement of said strip, a measurement gradient that can be obtained as a result and can be determined and compared with a predetermined optimum measurement gradient, whereupon, in the event of a difference, the measurement gradient that has been ascertained can be matched by electronic means to the predetermined optimum measurement gradient and the adapted values then obtained can be applied for strip movement control.

* * * * *

UNITED STATES PATENT AND TRADEMARK OFFICE
CERTIFICATE OF CORRECTION

PATENT NO. : 6,580,262 B1
DATED : June 17, 2003
INVENTOR(S) : Munker et al.

It is certified that error appears in the above-identified patent and that said Letters Patent is hereby corrected as shown below:

Column 2,
Line 5, please change "DETAILED DESCRIPTION OF THE INVENTION" to
-- DETAILED DESCRIPTION OF THE DRAWINGS --; and
Line 30, please insert -- DETAILED DESCRIPTION OF THE INVENTION --.

Signed and Sealed this

Ninth Day of December, 2003

JAMES E. ROGAN
*Director of the United States Patent and Trademark Office*